(12) United States Patent
Levy

(10) Patent No.: US 10,504,129 B2
(45) Date of Patent: Dec. 10, 2019

(54) IN STORE UPSELLING

(71) Applicant: Digiprint IP LLC, Longboat Key, FL (US)

(72) Inventor: Avery Levy, Longboat Key, FL (US)

(73) Assignee: DIGIPRINT IP LLC, Longboat Key, FL (US)

(*) Notice: Subject to any disclaimer, the term of this patent is extended or adjusted under 35 U.S.C. 154(b) by 0 days.

(21) Appl. No.: 15/671,013

(22) Filed: Aug. 7, 2017

(65) Prior Publication Data

US 2019/0043072 A1 Feb. 7, 2019

(51) Int. Cl.
| | |
|---|---|
| *G06Q 30/00* | (2012.01) |
| *G06Q 30/02* | (2012.01) |
| *G06Q 20/20* | (2012.01) |
| *G06Q 30/06* | (2012.01) |
| *G07G 1/14* | (2006.01) |
| *G06Q 20/38* | (2012.01) |
| *G06Q 20/00* | (2012.01) |

(52) U.S. Cl.
CPC ......... *G06Q 30/0207* (2013.01); *G06Q 20/20* (2013.01); *G06Q 20/201* (2013.01); *G06Q 20/387* (2013.01); *G06Q 30/00* (2013.01); *G06Q 30/0601* (2013.01); *G07G 1/14* (2013.01); *G06Q 20/00* (2013.01)

(58) Field of Classification Search
CPC ............................................. G06Q 30/00–08
See application file for complete search history.

(56) References Cited

U.S. PATENT DOCUMENTS

| | | | |
|---|---|---|---|
| 5,572,653 A | 11/1996 | Detemple et al. | |
| 5,903,721 A | 5/1999 | Sixtus | |
| 6,317,722 B1 | 11/2001 | Jacobi et al. | |
| 6,587,835 B1 | 7/2003 | Treyz et al. | |
| 6,978,273 B1 | 12/2005 | Bonneau et al. | |
| 7,063,263 B2 | 6/2006 | Swartz et al. | |
| 7,299,202 B2 | 11/2007 | Swanson | |
| 10,134,077 B2 | 11/2018 | Levy | |
| 2006/0163349 A1 | 7/2006 | Neugbauer | |
| 2006/0235721 A1 | 10/2006 | Kavanagh et al. | |

(Continued)

FOREIGN PATENT DOCUMENTS

| | | |
|---|---|---|
| WO | WO 2018/170326 | 9/2018 |
| WO | WO 2018/170407 | 9/2018 |

OTHER PUBLICATIONS

U.S. Appl. No. 15/462,751, Avery Levy, Upselling Offerings to Customers, filed Mar. 17, 2017.

(Continued)

*Primary Examiner* — Michael Misiaszek
(74) *Attorney, Agent, or Firm* — Polsinelli LLP

(57) ABSTRACT

The present disclosure relates to identifying a product or service in a store and offering to sell products and services that the customer can purchase in that store. Methods and apparatus consistent with the present disclosure allow retail stores to provide real-time information to their customers about products and/or services that may complement another product that a customer is interested in purchasing. A portable electronic device, such as a cell phone, may receive wirelessly transmitted communications from wireless transmitters that are associated with products and services that the customer approaches, touches, or scans.

18 Claims, 5 Drawing Sheets

(56) References Cited

U.S. PATENT DOCUMENTS

| | | |
|---|---|---|
| 2007/0138268 A1 | 6/2007 | Tuchman |
| 2010/0174599 A1 | 7/2010 | Rosenblatt et al. |
| 2010/0250336 A1 | 9/2010 | Selinger et al. |
| 2011/0093361 A1 | 4/2011 | Morales |
| 2011/0137715 A1 | 6/2011 | O'Shea et al. |
| 2011/0137742 A1 | 6/2011 | Parikh et al. |
| 2011/0145093 A1 | 6/2011 | Paradise et al. |
| 2011/0173055 A1* | 7/2011 | Ross .................. G06Q 30/02 705/14.13 |
| 2011/0226853 A1 | 9/2011 | Soh et al. |
| 2011/0246293 A1 | 10/2011 | Hayward et al. |
| 2012/0085828 A1 | 4/2012 | Ziegler |
| 2012/0271712 A1 | 10/2012 | Katzin et al. |
| 2013/0002405 A1 | 1/2013 | Pesonen et al. |
| 2013/0134213 A1 | 6/2013 | Pallakoff et al. |
| 2013/0191213 A1 | 7/2013 | Beck et al. |
| 2013/0282466 A1 | 10/2013 | Hampton |
| 2013/0282533 A1* | 10/2013 | Foran-Owens .... G06Q 30/0641 705/27.1 |
| 2014/0095282 A1 | 4/2014 | Slonimsky et al. |
| 2014/0143086 A1 | 5/2014 | Birsin et al. |
| 2015/0095185 A1 | 4/2015 | Katukuri et al. |
| 2015/0112826 A1* | 4/2015 | Crutchfield, Jr. .. G06Q 30/0601 705/26.1 |
| 2015/0206128 A1 | 7/2015 | Torossian et al. |
| 2015/0278849 A1* | 10/2015 | Reichert ............ G06Q 30/0242 705/14.41 |
| 2015/0356660 A1 | 12/2015 | L'Heureux et al. |
| 2016/0253705 A1 | 9/2016 | Eom |
| 2016/0284014 A1 | 9/2016 | Adel |
| 2017/0221119 A1* | 8/2017 | Pellow ............... G06Q 30/0611 |
| 2018/0268457 A1 | 9/2018 | Levy |
| 2018/0268468 A1 | 9/2018 | Levy |
| 2019/0050895 A1 | 2/2019 | Levy |
| 2019/0050896 A1 | 2/2019 | Levy |
| 2019/0050908 A1 | 2/2019 | Levy |

OTHER PUBLICATIONS

PCT/US18/22744, Upsell System, Mar. 15, 2018.
U.S. Appl. No. 15/462,727, Avery Levy, Upselling Related Products via a User Device, filed Mar. 17, 2017.
U.S. Appl. No. 15/672,193, Avery Levy, System and Method for Tag Based Upselling, filed Aug. 8, 2017.
U.S. Appl. No. 15/672,121, Avery Levy, Method and Apparatus for Linking and Upsell System via a Tag, filed Aug. 8, 2017.
U.S. Appl. No. 15/672,198, Avery Lee, System and Method for Upselling Products and Servies, filed Aug. 8, 2017.
PCT/US18/22879, In Store Upselling, Mar. 16, 2018.
Amazon—Get Free assembly with select home fitness equipment, Jul. 18, 2017.
Ebay Enforces New Picture Requirements, Jun. 4, 2013.
Scan definition 2018.
PCT Application No. PCT/US2018/022879 International Search Report and Written Opinion dated Jun. 7, 2018.
PCT Application No. PCT/US2018/022744 International Search Report and Written Opinion dated Jun. 8, 2018.
U.S. Appl. No. 15/462,751 Office Action dated Mar. 2, 2018.
U.S. Appl. No. 15/462,751 Final Office Action dated Oct. 17, 2017.
U.S. Appl. No. 15/462,751 Office Action dated May 19, 2017.
U.S. Appl. No. 15/462,727 Final Office Action dated Nov. 16, 2017.
U.S. Appl. No. 15/462,727 Office Action dated May 24, 2017.
U.S. Appl. No. 15/672,192 Office Action dated May 18, 2018.
U.S. Appl. No. 15/672,192 Final Office Action dated Jan. 12, 2018.
U.S. Appl. No. 15/672,192 Office Action dated Sep. 11, 2017.
U.S. Appl. No. 15/672,121 Final Office Action dated Apr. 18, 2018.
U.S. Appl. No. 15/672,121 Office Action dated Sep. 8, 2017.
U.S. Appl. No. 15/672,198 Office Action dated May 17, 2018.
U.S. Appl. No. 15/672,198 Final Office Action dated Jan. 12, 2018.
U.S. Appl. No. 15/672,198 Office Action dated Sep. 11, 2017.
Krummert et al., (Krummert, B. (Jul. 25, 2013). Customer smartphones: Make them work for you. Restaurant Hospitality, Retrieved from https://search.proquest.com/docview/1412455375?accountid=14753).
U.S. Appl. No. 15/462,727 Office Action dated Jul. 6, 2018.
U.S. Appl. No. 15/462,727 Final Office Action dated Feb. 4, 2019.
U.S. Appl. No. 15/672,193 Final Office Action dated Mar. 13, 2019.
U.S. Appl. No. 15/672,121 Office Action dated Jan. 25, 2019.
U.S. Appl. No. 15/672,198 Final Office Action dated Mar. 7, 2019.
U.S. Appl. No. 16/195,305, Avery Levy, Upselling to Customers, filed Nov. 19, 2018.

* cited by examiner

IN STORE UPSELLING

BACKGROUND OF THE INVENTION

Field of the Invention

The present invention is generally directed to systems and methods for selling products or services. More specifically, the present invention assists retailers to provide offers to customers that serve to increase sales and/or incentivize traffic flow through a store such that sales are optimized.

Description of the Related Art

Methods and systems for selling products and services to customers today are performed via a variety of means that include direct person to person sales, by phone, or by computer via the internet. These systems and methods are limited as they do not timely or conveniently provide information that could generate serendipitous (impulse) purchase of non-related items nor encourage customer traffic through a retail environment.

What are needed are systems and methods that allow products and services sold by a store to timely make offerings to customers that provide customers with real-time information about a related product, ancillary products and/or more choices by providing them with information in real-time that incentivizes the customer to travel to other parts of the store to discover needs they had not recognized previously.

SUMMARY OF THE PRESENTLY CLAIMED INVENTION

Methods, non-transitory computer readable medium, and apparatus consistent with the present disclosure relate to identifying products or services offered by a store to be provided to customers when they are shopping. Methods and apparatus consistent with the present disclosure allow retail stores to provide real-time information to their customers about products and/or services located in the store.

A method consistent with the present disclosure may receive product identifying information from a user device over a network interface. That product identifying information may have been received by the user device via a wirelessly transmitted signal, after which the user device transmits that identifying information to a computing device via the network interface. After the product identifying information has been received by the computing device, the computing device may access a database and cross-reference that received product information with one or more other products, the cross-referencing of the received product information with the one or more other products may have been performed based on one or more conditions stored in the database. After the product identifying information has been cross-referenced one or more offerings may be sent to the user device via the network interface based on the cross-referenced information.

When the method of the presently claimed invention is implemented as a non-transitory computer readable storage medium a processor executing instructions may implement methods consistent with the present disclosure. Here again product identifying information may be received from a user device over a network interface. That product identifying information may have been received by the user device via a wirelessly transmitted signal, after which the user device transmits that identifying information to a computing device via the network interface. After the product identifying information has been received by the computing device, the computing device may access a database and cross-reference that received product information with one or more other products, the cross-referencing of the received product information with the one or more other products may have been performed based on one or more conditions stored in the database. After the product identifying information has been cross-referenced one or more offerings may be sent to the user device via the network interface based on the cross-referenced information.

An apparatus consistent with the present disclosure may include a memory, a processor that executes instructions out of the memory, a database, and a network interface, where product identifying information may be received from a user device over the network interface. That product identifying information may have been received by the user device via a wirelessly transmitted signal, after which the user device transmits that identifying information to a computing device via the network interface. After the product identifying information has been received by the computing device, the computing device may access the database and cross-reference that received product information with one or more other products, the cross-referencing of the received product information with the one or more other products may have been performed based on one or more conditions stored in the database. After the product identifying information has been cross-referenced one or more offerings may be sent to the user device via the network interface based on the cross-referenced information.

DETAILED DESCRIPTION

The present disclosure relates to identifying a product or service in a store and offering to sell other products and services that the customer can purchase in that store. Methods and apparatus consistent with the present disclosure allow retail stores to provide real-time information to their customers about products and/or services that are available in the store that the customer may be interested in purchasing. A portable electronic device, such as a cell phone, may receive wireless communications from wireless transmitters that are associated with products and services that the customer approaches, touches, or scans. Wireless transmission technologies associated with the present disclosure may include any type of wireless transmission capability known in the art, including, yet not limited to radio frequency identifiers (RFID), Bluetooth™, near field data communications (NFC), iBeacon, CCD, MEMS or other wireless transmission technique.

The received wireless communication may be received from wireless tags placed on a product or service offering. By placing wireless tags on products and/or service offerings, the store can offer products and/or services based on defined sales goals or other conditions (eg. weather, date, temperature, traffic, etc). In certain instances those offerings may complement each other or be used to drive sales of a specific product/service or to increase general traffic in a specific location in a store in an attempt to increase sales.

Products and services offered to a particular customer may be related to a product previously purchased by that customer or be related to a product that a customer has access to. In certain instances, a product that a customer has access to may include a tag, such as a circuit, a chip, or printed matter which may be affixed, printed or embedded that may provide information to an electronic device of a customer. After the user device receives information provided by the product tag, information on other products or services related to the tagged product may be accessed by another computing device for transmission to the user device.

Figure 1:
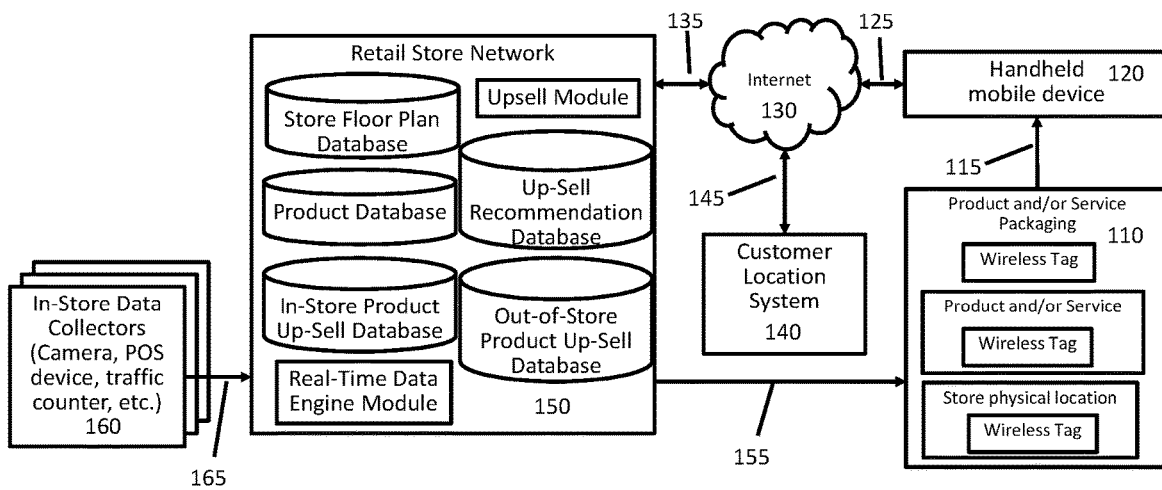
FIG. 1 illustrates an exemplary environment where an in store upsell system may provide information and services to a user operating a user device.

FIG. 1 illustrates an exemplary environment where an in store upsell system may provide information and services to a user operating a user device. FIG. 1 includes packaging associated with a product or service 110, a handheld mobile device 120, the internet 130, a customer location system 140, a retail store network 150, and in-store data collection devices 160.

Note that the package 110 of FIG. 1 includes several different tags configured to transmit wireless signals, including a first general wireless tag, a product or service wireless tag, and a store physical location wireless tag. The different wireless tags of FIG. 1 may be physically connected to a product/service offering or may be included in packaging that is attached to a product/service offering. Wireless communications 115 may be sent to handheld mobile device 120 whenever mobile device 120 is in close proximity to a product's wireless tag.

Mobile device 120, customer location system 140, and retail store network may communicate via communication channels 125, 135, 145, and internet 130 when functions consistent with the present disclosure are performed.

Note that retail store network 150 includes an upsell module, a store floor plan database, a product database, an in-store product up-sell database, an upsell recommendation database, an out-of-store product up-sell data base, and a real-time data engine module. Retail store network 150 may receive communications 165 when receiving information from one or more different in-store data collection devices 160. Types of in-store data collection devices 160 that may be used with methods and apparatus consistent with the present disclosure include cameras, point of sale (POS) devices/terminals, traffic counters, or other equipment that may sense any situational or environmental conditions related to the store.

Figure 2:
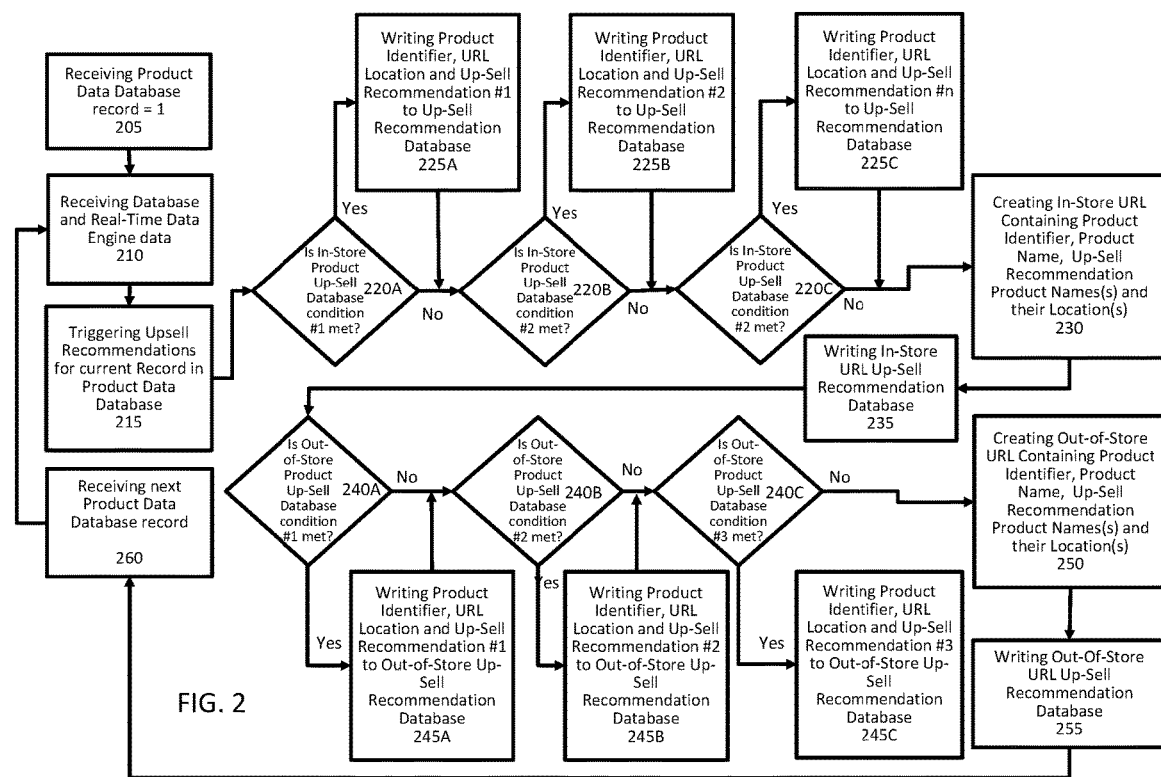
FIG. 2 illustrates an exemplary flow chart of up-selling software that may operate on computers associated with a retailer.

FIG. 2 illustrates an exemplary flow chart of up-selling software that may operate on computers associated with a retailer. FIG. 2 begins with step 205 where a first record, record 1, is received from a product database. This first record may include information regarding a product that the customer may approach in a store. Next in step 210, information relating to may be received from the database and a real-time data engine that is related to the product. After step 210, step 215 triggers the evaluation of up-sell recommendations related to the current database record 1. Then in a series of determination steps 220A, 220B, and 220C various in-store up-sell database conditions may be evaluated when those in-store up-sell recommendations are generated based on particular in-store up-sell conditions.

Determination step 220A evaluates whether a first in-store up-sell database condition (condition #1) has been met, when yes program flow moves to step 225A where a product identifier, a universal resource locator location, and a first up-sell recommendation (recommendation #1) may be populated into an in-store up-sell recommendation database in step 225A. After step 225A or when in-store upsell condition #1 in determination step 220A is not met, program flow moves to step 220B.

Then, determination step 220B evaluates whether a second in-store up-sell database condition (condition #2) has been met, when yes program flow moves to step 225B where a product identifier, a universal resource locator location, and a first up-sell recommendation (recommendation #2) may be populated into the in-store up-sell recommendation database in step 225B. After step 225B or when in-store upsell condition #2 in determination step 220B is not met, program flow moves to step 220C.

Similarly determination step 220C evaluates whether a third in-store up-sell database condition (condition #3) has been met, when yes program flow moves to step 225C where a product identifier, a universal resource locator location, and a first up-sell recommendation (recommendation #3) may be populated into the in-store up-sell recommendation database in step 225C. After step 225C or when in-store upsell condition 3 in determination step 220C is not met, program flow moves to step 230.

In step 230 an in-store URL is created. This in-store URL may be stored in a database that cross references a product identifier, a product name, an up-sell recommendation, product names of related products, and the locations of those related products. After step 230, the information created in step 230 may be written to an in-store up-sell recommendation database in step 235 of FIG. 2.

After step 235, determination steps 240A, 240B, and 240C various out-of-store up-sell database conditions may be evaluated when out-of-store up-sell recommendations are generated based on particular out-of-store up-sell conditions.

Determination step 240A evaluates whether a first out-of-store up-sell database condition (condition #1) has been met, when yes program flow moves to step 245A where a product identifier, a universal resource locator location, and a first out-of-store up-sell recommendation (recommendation #1) may be populated into an out-of-store up-sell recommendation database in step 245A. After step 245A or when out-of-store upsell condition #1 in determination step 220A is not met, program flow moves to step 240B.

Then, determination step 240B evaluates whether a second out-of-store up-sell database condition (condition #2) has been met, when yes program flow moves to step 245B where a product identifier, a universal resource locator location, and a first up-sell recommendation (recommendation #2) may be populated into the out-of-store up-sell recommendation database in step 245B. After step 245B or when out-of-store up-sell condition #2 in determination step 240B is not met, program flow moves to step 220C.

Similarly determination step 240C evaluates whether a third out-of-store up-sell database condition (condition #3) has been met, when yes program flow moves to step 245C where a product identifier, a universal resource locator location, and a first up-sell recommendation (recommendation #3) may be populated into the out-of-store up-sell recommendation database in step 245C. After step 245C or when out-of-store upsell condition 3 in determination step 240C is not met, program flow moves to step 250.

In step 250 an out-of-store URL is created. This out-of-store URL may be stored in a database that cross references a product identifier, a product name, an up-sell recommendation, product names of related products, and the locations of those related products. After step 250, the information created in step 250 may be written to an out-of-store up-sell recommendation database in step 2555 of FIG. 2.

After step 255, program flow moves to step 260 of FIG. 2 where information related to another or next product may be received as a process relating to populating the in-store up-sell database and the out-of-store database continues. After step 255 program flow moves back to the initial step 210 of FIG. 2 where the steps of FIG. 2 may be repeated when populating the in-store up-sell database and the out-of-store database.

The steps of FIG. 2, thus allow products to be entered into an in-store and an out-of-store database, where those databases cross reference information related to other products that may be related to different products sold by a retailer. Products sold or offered to customers may be or include any type of service offered by a retailer. In certain instances, information relating to products or services and/or upgrades/incentives from: banks and financial institutions; sports and theatre venues; travel sites and travel agencies, hotels, restaurants, rental cars; real estate transactions of any kind; non-profits may be offered using systems and apparatus consistent with the present disclosure.

Figure 3:
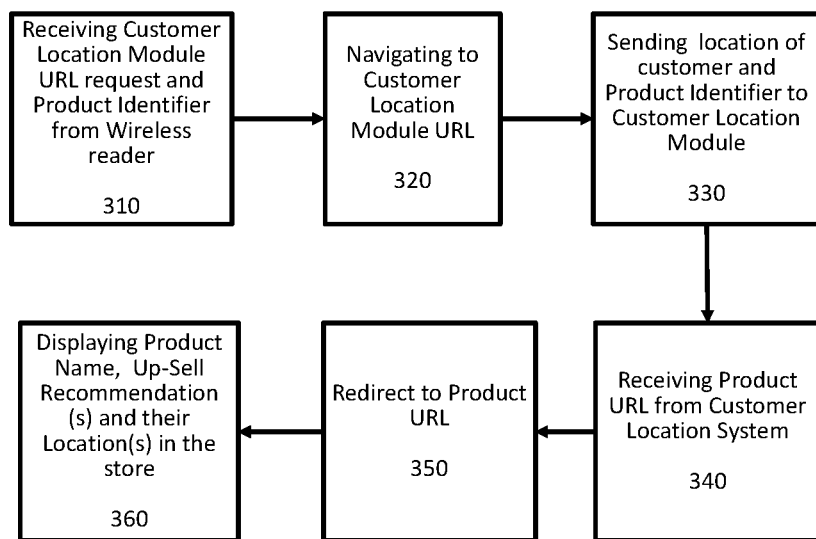
FIG. 3 illustrates an exemplary flow chart of program flow that may be executed at a user device when a customer visits a store or shops.

FIG. 3 illustrates an exemplary flow chart of program flow that may be executed at a user device when a customer visits a store or shops. In certain instances, the functionality illustrated in FIG. 3 may include the use of voice recognition at a user device.

Step 310 of FIG. 3 is where a request related to an identified product may be received by a mobile device. The product may be identified by the user of the user device engaging (reading) information from a wireless tag of the product. The request received from the user device may be a request to receive information regarding other products sold by the retailer that are related to the product identified by the wireless tag read by the user device. The identified product and the request may be related to a URL that may be accessed by a browser at the user device.

After the product is identified and the request has been received, program flow may move from step 310 to step 320 of FIG. 3. Step 320 may then prepare to navigate the browser at the user device via the URL. To accomplish this the customer location and the product identifier may be sent to a customer location module system in step 330. After step 330, the information related to the URL may be received from a customer location system in step 340.

Then in step 350, the browser of the user device may be redirected via the URL. This redirection may cause the browser of the user device to receive a WEB page associated with the URL. Finally, in step 360 the WEB page may be displayed on a display at the user device. Information included in the WEB page may include the product name, one or more product up-sell recommendations, and information that identify locations in the store where products related to those up-sell recommendations may be found in the store. The actions performed by the steps of FIG. 3 allow a user device to scan an wireless tag of a first product and to receive information regarding products that are related to the first product that are offered for sale in different locations of a particular store.

In an example, a customer may scan a wireless tag of a piece of wood, and then receive up-sell offerings related to hammer and nails and/or saws that the store sells. When the customer wishes to also purchase a saw, they may select a saw and receive information, such as a map that identifies where the saw is located in the store. Mappings or locations may be provided to a user device that identifies a store isle. In other instances, location information may be associated with a geo-location associated with a global positioning system (GPS) location. In other instances, the customer may be offered discounts in gardening because, if they are building a deck, they may be gardening and the sales in gardening are slow today and the store would like to generate traffic to drive gardening sales.

Figure 4:
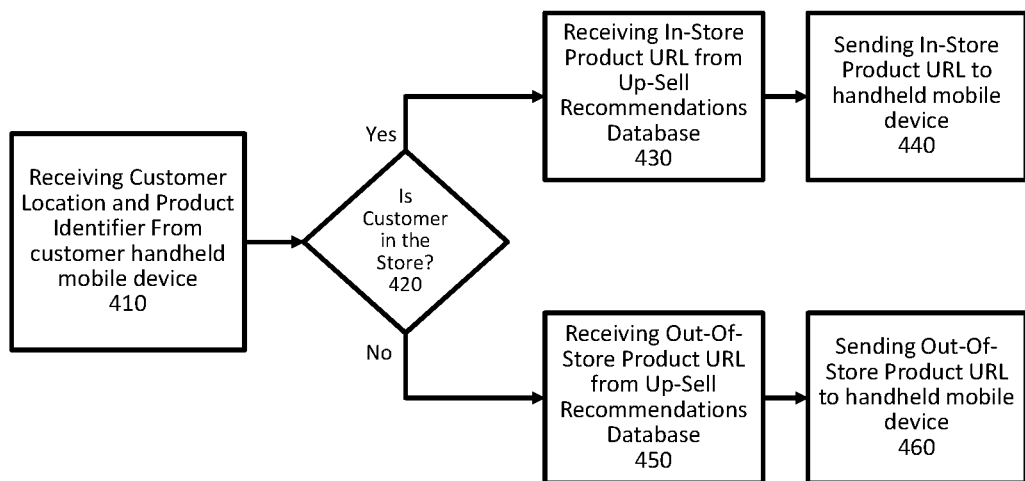
FIG. 4 illustrates exemplary flow chart of program flow of a module that tracks the location of a customer.

FIG. 4 illustrates exemplary flow chart of program flow of a module that tracks the location of a customer. The flow chart of FIG. 4 begins with step 410 where a customer location is received from a user device. Here again that location information may be identified by a GPS system. Alternatively or additionally, the customer location may be identified by other means, via cameras located in the store or via transmissions sent from a user device that are received by location detectors distributed throughout the store.

After step 410, determination step 420 identifies whether the customer is in the store, when yes, program flow moves to step 430. Then in step 430, information may be retrieved from an up-sell recommendations database that identifies one or more URLs that may be used to access WEB pages associated with products near a customer's location in the store. Those in-store URLs may be sent to the user device in step 440, where a user of that user device may access WEB pages that include information relating to products that the customer may be interested in.

When determination step 420 identifies that the customer is not in the store, program flow may move from step 420 to step 450, where out-of-store product URLs may be retrieved from an out-of-store recommendations database. Then in step 460, those out-of-store URLs may be sent to the user device, where a user of that user device may access WEB pages that include information relating to products that the customer may be interested in.

TABLE 1

| Location ID | Isle | Position | Shelf |
|---|---|---|---|
| LOC 1 | A-Right | 50 | 1 |
| LOC 2 | C-Left | 20 | 4 |
| ... | | | |
| LOC Cooler | End Cap | Front | 2 |

Table 1 illustrates exemplary information that may be stored in a store floor plan location database. The table of FIG. 1 includes columns of location identifier (ID), isle, position, and shelf. Note that locations included in FIG. 1 are a first location (LOC 1), a second location (LOC 2), and a third location (LOC Cooler). Note that table 1 cross references each one of these location identifiers to an isle, a position, and a shelf. For example, LOC 1 is located on the right side of isle A, in position 50, on shelf 1. As such information in table 1 may be used to identify locations within a store.

TABLE 2

| Product ID | Product Name | Location | Price | Inventory | URL |
|---|---|---|---|---|---|
| A45 | Shoe A | LOC 1 | $20 | 20 | https://shoea.com |
| G21 | Hat A | LOC 2 | $5.00 | 5 | https://hata.com |
| ... | | | | | |
| Z98 | Fish A | LOC Cooler | $15.00 | 10 | https://fisha.com |

Table 2 illustrates exemplary information that may be stored in a product database. Columns in table 2 include product identifier (ID), product name, location, price, inventory, and URL. Note that table 2 cross references product identifiers with a product name, a location, a price, an inventory count, and a URL.

Note a first row of table 2 cross references product identifier A45 with shoe A, location LOC 1, and a price of $20.00. This first row of table 2 also shows that the store has 20 "shoe A" products in inventory and that information relating to shoe A may be referenced via URL https://shoesa.com. Note also that similar information may be accessed relating to "hat A" and to "fish A," where fish A is located at location LOC Cooler and costs $15.00. The information in table 2 may be used to identify conditional comparisons that may be used by an up-sell system consistent with the present disclosure.

Table 3 illustrates exemplary information that may be stored in an in-store product up-sell databased consistent with the present disclosure. Note that table 3 includes columns of product identifier (ID), product name, condition 1: store sales <$1000, condition 2: traffic in isle 3<50, condition 3: inventory >50, and condition N temperature >90. Note that table 3 includes that same product names/identifiers as those included in table 2 (A45→shoe A, G21→hat A, and Z98→fish A. Note also that conditions 1-N relate to store sales, isle traffic, inventory, and a temperature.

The data of table 3 may be used to cross reference product information with sales, with customer traffic, inventory, and with environmental conditions when an up-sell system updates offerings to customers. Note that product ID A45, product shoe A, is cross referenced via condition #1 with product identifier G21 (hat A) and is cross referenced via condition #2 with product identifier Z98 (fish A). Based on this it may be determined that shoe A may be associated with hat A (G21) based on a sales volume, and that shoe A may be associated with fish A based on how many persons are currently in isles associated with an isle where shoe A resides and an isle where fish A is located.

The information of table 3 may also be used to identify conditions when an up-sell offering can be provided to customers. For example, if sales are slow (<$1000, condition #1), the store may choose to have the first up-selling offering be a low priced item to "break the ice" and get a sale. In another example, when traffic is very slow in a particular isle (<50, condition #2), the database could identify items to customers in an attempt to drive traffic through those slow isles.

The data of table 3 may also be cross referenced with the data of tables 1 and 2. For example, fish A may be associated with a cost of $15.00, an inventory of 10, a URL of https://fisha.com, and a location LOC Cooler on the isle "End Cap." In another example shoe A may be associated with a cost of $20.00, an inventory of 20, a URL of https://shoea.com, and a location LOC 1 (right side of isle A, in position 50, on shelf 1).

TABLE 3

| Product ID | Product Name | Condition 1: Store Sales < $1000 | Condition 2: Traffic in Isle 3 < 50 | Condition 3: Inventory > 50 | ... | Condition N: Temperature > 90 |
|---|---|---|---|---|---|---|
| A45 | Shoe A | G21 | Z98 | | | none |
| G21 | Hat A | none | A45 | | | Z09 |
| ... | | | | | | |
| Z98 | Fish A | A45 | None | | | none |

TABLE 4

| Prod ID | In-Store Product URL | Out of Store Product URL | Prod Name | Up-Sell Rec. #1 | Loc. N | ... | Up-Sell Rec. #N | Loc. N |
|---|---|---|---|---|---|---|---|---|
| A45 | https://Instoreshoesa.com | https://outofstoreshoesa.com | Shoe A | G21 | LOC M | | Z98 | LOC Cool |
| G21 | https://instorehata.com | https://outofstorehata.com | Hat A | A45 | LOC 1 | | Z98 | LOC Cool |
| ... | | | | | | | | |
| Z98 | https://instorefisha.com | https://outofstorefisha.com | Fish A | A45 | LOC 1 | | G21 | LOC M |

Table 4 illustrates exemplary information that may be stored in an up-sell recommendations database. Table 4 cross references the products and product identifiers of tables 1-3 with in-store product URLs, out-of-store product URLs, and different upsell offerings. As such, an up-sell offering to sell hat A may be offered to a customer when that customer is interested in purchasing shoe a, or an offering to sell shoe A may be offered to a customer when that customer is interested in purchasing hat A. Note that table 4 identifies this by cross-referencing product ID A45 (shoe A) with product ID G21 (hat A) via up-sell offering #1. Note also that up-sell offering #1 is also cross-referenced to product ID G21 (hat A) with product ID A45 (shoe A). As such, product identifier codes and in-store locations for the recommended up-sell(s) may help sell related or unrelated products or services. This up-sell database may have been generated by an up-sell module consistent with the present disclosure.

Figure 5:
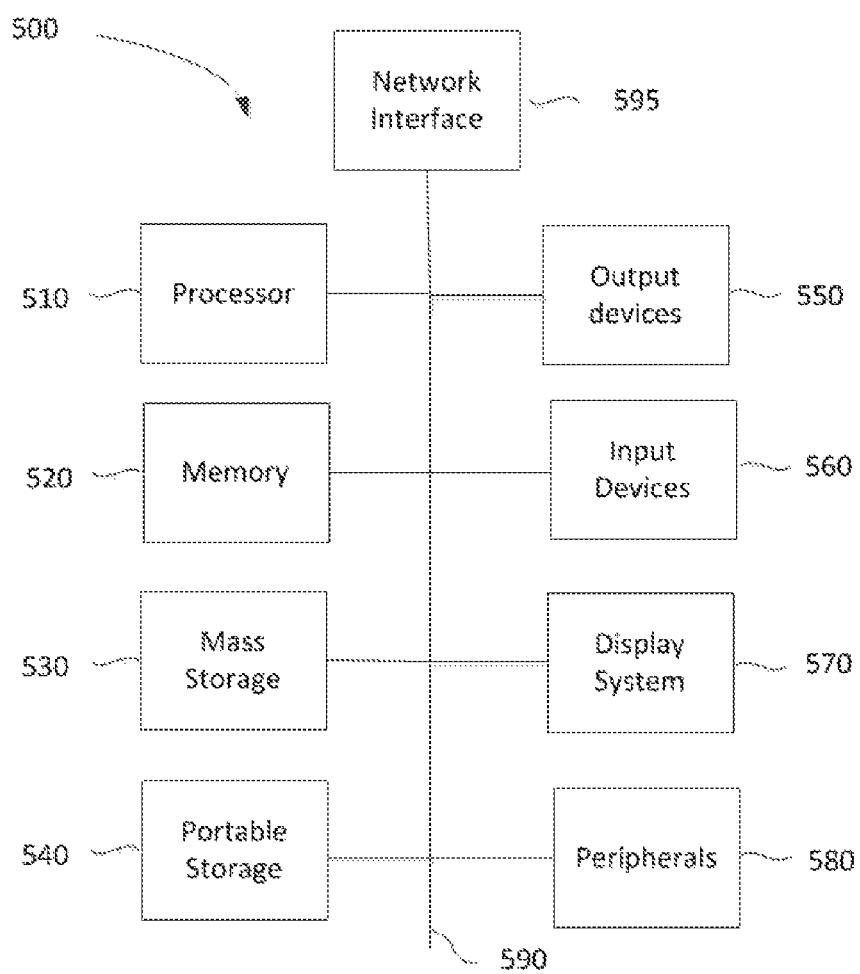
FIG. 5 illustrates an exemplary computing system that may be used to implement an embodiment of the present invention.

FIG. 5 illustrates an exemplary computing system that may be used to implement an embodiment of the present invention. The computing system 500 of FIG. 5 includes one or more processors 510 and main memory 520. Main memory 520 stores, in part, instructions and data for execution by processor 510. Main memory 520 can store the executable code when in operation. The system 500 of FIG. 5 further includes a mass storage device 530, portable storage medium drive(s) 540, output devices 550, user input devices 560, a graphics display 570, peripheral devices 580, and network interface 595.

The components shown in FIG. 5 are depicted as being connected via a single bus 590. However, the components may be connected through one or more data transport means. For example, processor unit 510 and main memory 520 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 520.

Portable storage device 540 operates in conjunction with a portable non-volatile storage medium, such as a FLASH memory, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD), a plasma display, an organic light-emitting diode (OLED) display, an electronic ink display, a projector-based display, a holographic display, or another suitable display device. Display system 570 receives textual and graphical information, and processes the information for output to the display device. The display system 570 may include multiple-touch touchscreen input capabilities, such as capacitive touch detection, resistive touch detection, surface acoustic wave touch detection, or infrared touch detection. Such touchscreen input capabilities may or may not allow for variable pressure or force detection.

Peripherals 580 may include any type of computer support device to add additional functionality to the computer system. For example, peripheral device(s) 580 may include a modem or a router.

Network interface 595 may include any form of computer interface of a computer, whether that be a wired network or a wireless interface. As such network interface 595 may be an Ethernet network interface, a BlueTooth™ wireless interface, an 802.11 interface, a cellular phone interface, or a near field data communications wireless interface.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, a hand held computing device, a telephone ("smart" or otherwise), a mobile computing device, a workstation, a server (on a server rack or otherwise), a minicomputer, a mainframe computer, a tablet computing device, a wearable device (such as a watch, a ring, a pair of glasses, or another type of jewelry/clothing/accessory), a video game console (portable or otherwise), an e-book reader, a media player device (portable or otherwise), a vehicle-based computer, some combination thereof, or any other computing device. The computer can also include different bus configurations, networked platforms, multi-processor platforms, etc. The computer system 500 may in some cases be a virtual computer system executed by another computer system. Various operating systems can be used including Unix, Linux, Windows, Macintosh OS, Palm OS, Android, iOS, and other suitable operating systems.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a FLASH memory, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for making an offering, the method comprising:
   receiving product identifying information transmitted from a user device over a network interface at a computing device, the product identifying information associated with a wireless tag, wherein the identifying information was received in a store by the user device by scanning the wireless tag;
   identifying an aisle in the store that has fewer than a threshold level of customer traffic, the level of customer traffic corresponding to a number of customers that are currently in the aisle;
   cross-referencing the received product information with at least one other product that resides in the identified aisle based at least in part on the number of customers currently in the aisle of the store, wherein the at least one other product is identified by accessing database information that associates product information with store location information;
   sending an offering to purchase the at least one other product to the user device via the network interface, wherein the offering sent identifies the aisle in the store where the at least one other product is located, the offering including a price associated with purchasing the at least one other product;
   tracking a location of the user device as the user device moves to the aisle in the store, wherein a user of the user device purchases the at least one product for the price according to the offering;
   receiving additional product information from a second user device;
   identifying a real-time condition associated with the store, the real-time condition associated with an amount of sales not meeting a threshold level;
   cross-referencing the additional product information received from the second user device with an offering for a second product based on the amount of sales not meeting the threshold level; and
   sending an offering to purchase the second product at a discounted price, wherein the offering for the second product includes the discounted price and identifies a location in the store where the second product resides, the location of the second product identified by an aisle, a position, and a shelf in the store associated with the second product.

2. The method of claim 1, further comprising identifying a location associated with the user device, wherein the at least one other product is associated with another location identified in the offering to purchase the at least one other product.

3. The method of claim 1, further comprising associating the at least one other product with one or more conditions associated with a retailer.

4. The method of claim 3, wherein the one or more conditions associated with the retailer relate one or more other real-time conditions at the retailer.

5. The method of claim 4, wherein the one or more other real-time conditions correspond to at least one of an amount of other sales or a number of customers in a particular location at the retailer.

6. The method of claim 1, wherein the at least one other product is a service.

7. A non-transitory computer readable storage medium having embodied thereon a program executable by a processor for implementing a method for making an offering, the method comprising:
   receiving product identifying information transmitted from a user device over a network interface at a computing device, the product identifying information associated with a wireless tag, wherein the identifying information was received in a store by the user device by scanning the wireless tag;
   identifying an aisle in the store that has fewer than a threshold level of customer traffic, the level of customer traffic corresponding to a number of customers that are currently in the aisle;
   cross-referencing the received product information with at least one other product that resides in the identified aisle based at least in part on the number of customers currently in the aisle of the store, wherein the at least one other product is identified by accessing database information that associates product information with store location information;
   sending an offering to purchase the at least one other product to the user device via the network interface, wherein the offering sent identifies the aisle in the store where the at least one other product is located, the offering including a price associated with purchasing the at least one other product;
   tracking a location of the user device as the user device moves to the aisle in the store, wherein a user of the user device purchases the at least one product for the price according to the offering;
receiving additional product information from a second user device;
identifying a real-time condition associated with the store, the real-time condition associated with an amount of sales not meeting a threshold level;
cross-referencing the additional product information received from the second user device with an offering for a second product based on the amount of sales not meeting the threshold level; and
sending an offering to purchase the second product at a discounted price, wherein the offering for the second product includes the discounted price and identifies a location in the store where the second product resides, the location of the second product identified by an aisle, a position, and a shelf in the store associated with the second product.

8. The non-transitory computer readable storage medium of claim 7, the program further executable to identify a location associated with the user device, wherein the at least one other product is associated with another location identified in the offering to purchase the at least one other product.

9. The non-transitory computer readable storage medium of claim 7, the program further executable to associate the at least one other product with one or more conditions associated with a retailer.

10. The non-transitory computer readable storage medium of claim 9, wherein the one or more conditions associated with the retailer relate one or more other real-time conditions at the retailer.

11. The non-transitory computer readable storage medium of claim 10, wherein the one or more other real-time conditions correspond to at least one of an amount of other sales or a number of customers in a particular location at the retailer.

12. The non-transitory computer readable storage medium of claim 7, wherein the at least one other product is a service.

13. An apparatus for making an offering, the apparatus comprising:
a network interface that receives product identifying information transmitted from a user device, the product identifying information associated with a wireless tag, wherein the identifying information was received in a store by scanning the wireless tag; and
a database that stores information that associates product information with store location information;
a memory; and
a processor that executes instructions out of the memory to:
identify an aisle in the store that has fewer than a threshold level of customer traffic, the level of traffic corresponding to a number of customers that are currently in the aisle,
cross-reference the received product information with at least one other product that resides in the identified aisle based at least in part on the number of customers currently in the aisle of the store by accessing the database information that associates the product information with the store location information,
prepare an offer that identifies the aisle in the store where the at least one other product is located, wherein the offer for the at least one other product is sent to the user device and the offer identifies a price associated with purchasing the at least one other product,
track a location of the user device as the user device moves to the aisle in the store, wherein a user of the user device purchases the at least one product for the price according to the offering, wherein additional product information is received from a second user device via the network interface,
identify a real-time condition associated with the store, wherein the real-time condition is associated with an amount of sales not meeting a threshold level,
cross-reference the additional product information received from the second user device with an offering for a second product based on the amount of sales not meeting the threshold level, and
prepare an offering to purchase the second product at a discounted price, the offer to purchase the second product identifying an aisle, a position, and a shelf in the store where the second product is located, wherein the offering to purchase the second product at the discounted price is sent to the second user device via the network interface.

14. The apparatus of claim 13, wherein a location associated with the user device is identified and the at least one other product is associated with another location identified in the offering to purchase the at least one other product.

15. The apparatus of claim 13, wherein the at least one other product is associated with one or more conditions at the retailer.

16. The apparatus of claim 15, wherein the one or more conditions associated with the retailer relate one or more other real-time conditions at the retailer.

17. The apparatus of claim 16, wherein the one or more other real-time conditions correspond to at least one of an amount of other sales or a number of customers in a particular location at the retailer.

18. The apparatus of claim 13, wherein the at least one other product is a service.

* * * * *